Patented June 20, 1939

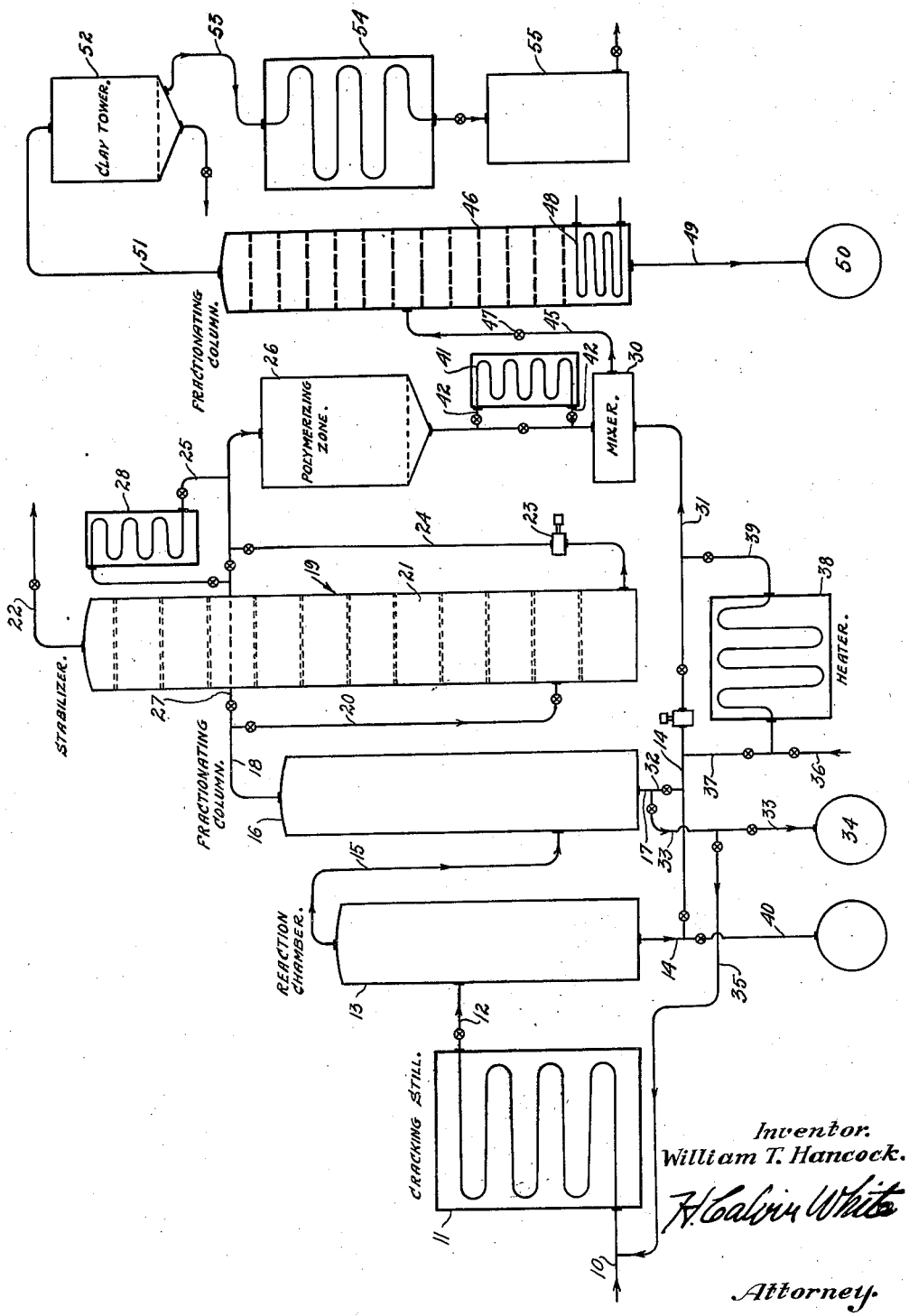

2,162,716

UNITED STATES PATENT OFFICE 2,162,716

PROCESS OF REFINING CRACKED PETROLEUM DISTILLATE

William T. Hancock, Long Beach, Calif.

Application October 19, 1938, Serial No. 235,768

5 Claims. (Cl. 196—147)

This invention relates generally to improved systems for the treatment of petroleum distillate to produce high quality finished gasoline, and in certain of its aspects deals particularly with processes involving both the production and treatment of pressure distillate by a continuous method and in the same system. The present invention embodies various improvements over the invention disclosed in my copending application, Serial No. 161,954, filed September 1, 1937, on Treating petroleum oils.

In accordance with the method described in my copending application, heated pressure distillate is subjected to polymerization, and the polymerized hydrocarbons are admixed with a heated heavier oil from which the gasoline fraction then is distilled. Preferably, polymerization is accomplished by passing the pressure distillate through a body of adsorptive earth. The primary purpose of admixing the polymerized distillate with a heated and heavier oil is to remove from the fraction (gasoline) to be recovered, gums, polymerized bodies and sulphur containing compounds, thereby producing a finished gasoline low in gums and sulphur, and of stable water white color. Certain improvements contemplated by the present invention are directed particularly to increasing the effectiveness of the pressure distillate polymerization, and the subsequent removal of undesirable compounds by the action of the heavier oil. In other aspects, the invention aims to incorporate the above described pressure distillate treatment in a cracking system which produces the pressure distillate, and to utilize a heated residual fraction from the cracking stage, as a part or all of the solvent oil admixed with the polymerized distillate.

I have found that the effectiveness of the polymerizing medium, for example, adsorptive clay, is materially enhanced by first removing from the pressure distillate fixed and sulphur containing gases, and preferably also the lighter hydrocarbons beyond the gasoline range. The increased polymerizing efficiency under these conditions becomes of importance in the subsequent treatment of the distillate, since it is found that the gum and sulphur removing capacity of the heavier oil admixed with polymerized distillate, is improved by the distillate having been depleted of its fixed gas and lighter hydrocarbon content.

In the production of the pressure distillate, a suitable charging stock is subjected to cracking and the vaporized pressure distillate fraction separated from the relatively heavy and vaporized residue. This initial separation of the residue and vapors may be followed by the fractionation of the vapors to remove heavier than gasoline fractions, and the lighter pressure distillate fraction then subjected to stabilization and polymerization as previously outlined.

Another important object of the invention is to utilize the unvaporized residue from the cracking stage, either alone or admixed with other suitable oil, as a solvent medium to be admixed with the polymerized pressure distillate. Since the cracking residue is desirably heavy for purposes of treating the distillate, and comes from the reaction chamber at a temperature sufficiently high for the purposes of the treating stage, I am able to obviate the necessity for having to utilize, at least entirely, a solvent oil derived from a source extraneous to the cracking system.

The invention embodies various additional features and objects, but these as well as the aspects mentioned in the foregoing, will be fully understood and explained to better advantage in the following description. Throughout the description reference is had to the accompanying drawing which illustrates diagrammatically and in flowing sheet form, a typical and illustrative system embodying the invention.

Referring to the typical refining and treating system illustrated in the drawing, a suitable charging stock, for example fuel oil of around 17° A. P. I., is supplied through line 10 to the cracking still conventionally shown at 11, wherein the oil is heated to cracking temperature, say between 950° to 1050° F., under suitable pressure that may range from 100 to 150 pounds per square inch. The cracked oil stream is discharged through line 12 into the reaction chamber 13 within which the cracking reaction progresses and reformation occurs, all in the manner familiar to those skilled in the art. In the reaction chamber 13, the cracked vapors are separated from the unvaporized residue, the latter being discharged from the base of the chamber through line 14 and the vapors being taken off overhead through line 15. The vapors enter a suitable dephlegmator or fractionating column 16 from which the heavier ends, consisting mainly of a gas oil fraction, are removed through line 17. The bottoms removed from the reaction chamber through line 14 may consist substantially of a fuel oil fraction, heated to a temperature of around 800° to 850° F. and comprising about 50% to 60% of the charging stock. The temperature of the gas oil flowing through line 17 will, of course, be somewhat lower, say around 425° to 500° F., and the gas oil volume may amount to around 15% of the charging stock.

As will later appear, the hydrocarbons leaving the fractionating column through line 18 are subjected to polymerization for the purpose of removing gum forming constituents and placing sulphur containing compounds in condition for removal in the treating stage of the process. It is found that the efficiencies of the polymerizing stage, and also of the treating stage, particularly with respect to the promotion of maximum polymerization and removal of sulphur containing compounds, may greatly be improved by stabilizing the initially fractionated vapors, i. e., by removing fixed and sulphur containing gases, as well as lighter hydrocarbons beyond the gasoline range. Preferably, therefore, the hydrocarbons discharged through line 18 are thus stabilized in a stage generally indicated at 19, which is to be regarded merely as typical of any suitable method or apparatus for accomplishing such stabilization. As illustrative, I show the cracked vapors to be discharged through line 20 into a vertically extending, multiple plate fractionating or stabilizing column 21, from the top of which the fixed gases, including hydrogen sulphide, together with the lighter hydrocarbons included in the methane, ethane, and propane series, are discharged through line 22 for further processing or disposal in any desired manner. The stabilized pressure distillate, which may consist mainly of gasoline, is discharged by pump 23 through lines 24 and 25 to the polymerizing zone 26. Where the stabilizer is not used, vapors from line 18 are passed directly to the polymerizing zone through the valved by-pass line 27.

By the term "polymerization" I mean the transformation of hydrocarbons of relatively low molecular weight into hydrocarbons of relatively high molecular weight which, by reason of their higher boiling temperatures and gravities, are separable from the desirable lighter hydrocarbons.

It is to be understood that in the broad aspects of the invention, the fractionated hydrocarbons may be subjected to polymerization by any suitable method. For example, catalytic processes of the type using a catalyst such as phosphoric anhydride, or other known processes such as those involving a combination of extremely high temperatures and pressures, may be employed if desired. Preferably and typically, however, I polymerize the hydrocarbons by passing them through a body of adsorptive material, such as fuller's earth, Muroc clay, or other suitable adsorptive earths, contained within the clay tower 26. Ordinarily the hydrocarbons will be subjected to polymerization in liquid phase, although vapor phase polymerization may be employed if desired. The stabilized pressure distillate discharged through line 24 is, of course, in liquid phase. Where the stabilizing stage is omitted, the vapors may be passed directly through line 18 to the stabilizing zone, or the vapors may be partially or wholly condensed in the condenser 28 before undergoing polymerization. The pressure distillate preferably will be maintained at a temperature between 200° to 500° F. while in contact with the clay, and under pressure sufficient to keep the greater portion of the hydrocarbons in liquid phase.

In flowing through clay tower 26 the hydrocarbons are maintained in direct and intimate contact with the clay over a period of time required to effect substantially complete polymerization. The polymerized hydrocarbons are then discharged through line 29 into a mixer 30 which may be of any suitable type, in which the hydrocarbons are thoroughly commingled and admixed with a stream of oil being discharged into the mixer through line 31. All or part of the oil admixed with the polymerized distillate may be obtained from different sources, as will appear, although preferably the bulk will consist of the hot residuum being discharged from the reaction chamber through line 14. If desired, all or a portion of the gas oil fraction may be discharged from the fractionating column 16 through line 32 to be combined with the hot residuum flowing to the mixer; or the gas oil may otherwise be disposed of, as by discharging it through pipe 33 to storage 34, or by recirculating the gas oil through line 35 to the cracking still. Any desired amount of additional or make-up oil, such as fuel oil, crude oil, or any suitable fraction heavier than the polymerized pressure distillate, may be supplied from line 36 to the mixer for the purpose of supplementing the hot residuum. Dilution of the hot residuum may be desirable in cases where the cracking stock and residuum in chamber 13 run so high in sulphur as to impair the sulphur absorbing capacity of the residuum when admixed with the polymerized distillate. An unheated or relatively cool make-up oil may flow directly through pipe 37 connecting with line 14, or the oil may be passed through a heater 38 and thence through pipe 39 into line 14. Where the heater 38 is used, the temperature of the oil from line 14 will be increased to a point such that the combined streams entering the mixer through line 31 will have the proper temperature required for most effectively treating the pressure distillate being admixed therewith. Depending upon particular circumstances, that temperature may range as high as 600° F. or above.

In accordance with the preferred method of operation, the volume of the heavier oil discharged into the mixer 30 will exceed by from 2 to 4 times the volume of the pressure distillate being admixed therewith. This ratio is subject to variation in accordance with the relative temperature of the oils and the amount of the heavier oil required to have the proper solvent or treating action on a particular pressure distillate. Ordinarily, though not always necessarily, for best results the heavier oil will be heated to a temperature substantially higher than the temperature of the pressure distillate entering the mixer. For example, assuming the temperature of the polymerized distillate to run around 350° F., the temperature of the heavier oil stream may range from 450° to 525° F., or above. In general, the higher heavier oil temperatures are required when it is desired to flash off the gasoline fraction from the admixed oils, without the necessity for supplying further heat.

While for the purposes of the present process, I prefer to utilize the heated residuum from the reaction chamber as all or a part of the heavy oil, it is to be understood that as to certain aspects of the invention, the heavier oil may in its entirety be derived from an extraneous source through line 36, in which event the reaction chamber residue may be passed through line 40 to storage. It may be mentioned that this extraneously derived oil may consist of a crude oil containing gasoline as well as heavier fractions. The presence of gasoline in the heavier oil may be utilized to advantage in aiding, by virtue of the partial pressure effect of the lighter hydrocarbons, vaporization of the gasoline pressure distillate after the two oils are admixed, and in securing, in one operation, a final product comprising a blend of cracked and straight run gasolines.

In the event the hydrocarbons from line 18 are subjected to polymerization in vapor phase, it may be desirable to condense the polymerized hydrocarbons before they are discharged into the mixer. For this purpose, the vapors may be subjected to condensation in a suitable condenser 41 placed in the valved by-pass line 42.

The effect of admixing with the polymerized pressure distillate a heavier solvent oil is explained more fully and in detail in my copending application referred to above. For present purposes it will suffice to state that the heavier oil is found to perform two principal functions: First, to retain the gums and polymerized bodies in the clay treated pressure distillate to the extent that the final gasoline product is substantially gum free and possessed of a stable water white color; and second, to retain by virtue of solvent action or some physical or chemical affinity not fully understood, a large proportion of the sulphur compounds present in the pressure distillate. The effectiveness, from a treating standpoint, of combining the polymerized distillate with the heavier oil under the conditions described, and then distilling off the product gasoline, is demonstrated in practical operation by the fact that the process gives a color stable, low gum sulphur gasoline without the necessity for acid treatment.

The admixed oils are discharged through line 45 into fractionating column 46, within which gasoline is fractionally distilled from the heavier oil. Preferably, valve 47 will be set to hold a back pressure sufficient to maintain at least the major portion of the pressure distillate in liquid phase while being admixed with the heavier oil. At valve 47 a sufficient pressure drop may be maintained to vaporize the entire gasoline content of the admixed oils without the necessity for further heating, this being true where the temperature and volume of the heavier oil supplied to the mixer are sufficient to furnish the heat required for flash vaporization at reduced pressure. Otherwise, the heat necessary to vaporize the gasoline content of the admixed oils may be supplied by a heating coil 48 in the base of the fractionating column, or by any other suitable means. The unvaporized heavy oil remaining, and containing gums, polymerized bodies and sulphur compounds retained from the pressure distillate, is discharged through line 49 to storage 50.

The gasoline vapors may be subjected to final purification by discharging them through line 51 into a column 52 containing adsorptive clay which removes any traces of impurities that might be carried over. The vapors then flow through line 53 to the condenser 54, and the gasoline finally is collected in the receiver 55.

I claim:
1. The process of refining cracked petroleum distillate that includes, stabilizing heated cracked distillate containing a gasoline fraction by passing the distillate through a stabilizing zone and removing from the distillate sulphur containing gases and hydrocarbons lighter than said gasoline fraction, then subjecting to polymerization a stream of said heated distillate flowing from said stabilizing zone by passing the distillate through a body of adsorptive material while maintaining the distillate at least at a polymerizing temperature but below the temperature of cracking, heating a heavier oil having a substantially higher boiling range than said gasoline fraction, mixing said heated polymerized distillate with a substantially large quantity of the heated heavier oil under pressure sufficient to maintain the major portion of the gasoline constituents of said distillate in liquid phase during the mixing, then reducing the pressure of the mixed oils and vaporizing said gasoline fraction from the heavier oil by virtue of the pressure reduction and heat contained in the mixed oils, leaving polymerized and sulphur containing constituents of the distillate in the unvaporized oil, and condensing the vaporized gasoline fraction.

2. The process of refining cracked petroleum distillate that includes, stabilizing heated cracked distillate containing a gasoline fraction by passing the distillate through a stabilizing zone and removing from the distillate sulphur containing gases and hydrocarbons lighter than said gasoline fraction, then subjecting to polymerization a stream of said heated distillate flowing from said stabilizing zone by passing the distillate through a body of adsorptive material while maintaining the distillate at least at a polymerizing temperature but below the temperature of cracking, heating a heavier oil having a substantially higher boiling range than said gasoline fraction, mixing said heated polymerized distillate with a substantially large quantity of the heated heavier oil under pressure sufficient to maintain the major portion of the gasoline constituents of said distillate in liquid phase during the mixing, then further heating and reducing the pressure of the mixed oils and vaporizing said gasoline fraction from the heavier oil by virtue of the pressure reduction and heat contained in the mixed oils, leaving polymerized and sulphur containing constituents of the distillate in the unvaporized oil, and condensing the vaporized gasoline fraction.

3. The process of refining cracked petroleum distillate that includes, stabilizing heated cracked distillate containing a gasoline fraction by passing the distillate through a stabilizing zone and removing from the distillate sulphur containing gases and hydrocarbons lighter than said gasoline fraction, then subjecting to polymerization a stream of said heated distillate flowing from said stabilizing zone by passing the distillate through a body of adsorptive material while maintaining the distillate at least at a polymerizing temperature but below the temperature of cracking, heating a heavier oil having a substantially higher boiling range than said gasoline fraction, mixing said heated polymerized distillate with heated heavier oil under pressure sufficient to maintain the major portion of the gasoline constituents of said distillate in liquid phase during the mixing, said heavier oil being heated to a temperature higher than that of the polymerized distillate being admixed therewith and constituting a larger percentage of the mixture than said distillate, then reducing the pressure of the mixed oils and vaporizing said gasoline fraction from the heavier oil by virtue of the pressure reduction and heat contained in the mixed oils, leaving polymerized and sulphur containing constituents of the distillate in the unvaporized oil, and condensing the vaporized gasoline fraction.

4. The process of refining cracked petroleum distillate that includes, subjecting heated cracked distillate containing a liquid gasoline fraction to polymerization by passing the distillate through a body of adsorptive material while maintaining the distillate at a temperature of at least about 200° F. but below the temperature of cracking, continuously admixing said polymerized cracked distillate with a stream of heated cracked residue, under pressure sufficient to maintain the major portion of said gasoline constituents of said distillate in liquid phase during the mixing, then reducing the pressure of the mixed oils and vaporizing said gasoline fraction from the residue by virtue of the pressure reduction and heat contained in the mixed oils, leaving polymerized and sulphur containing constituents of the distillate in the unvaporized residue, and condensing the vaporized gasoline fraction.

5. The process of refining petroleum that includes, heating petroleum hydrocarbons to cracking temperature to form unvaporized residue and vaporized lighter hydrocarbons containing a cracked gasoline fraction, separating said vaporized hydrocarbons from the residue, subjecting said gasoline fraction to polymerization by passing the distillate at a temperature of at least about 200° F. but below the temperature of cracking, through a body of adsorptive material, then mixing the polymerized gasoline fraction with said separated and heated residue under pressure sufficient to maintain the major portion of gasoline constituents of said fraction in liquid phase during the mixing, then reducing the pressure of the mixed oils and vaporizing the gasoline fraction from said residue by virtue of the pressure reduction and heat contained in the mixed oils, leaving polymerized and sulphur containing constituents of the gasoline fraction in the residue, and condensing the vaporized gasoline fraction.

WILLIAM T. HANCOCK.